Nov. 3, 1964    M. E. WEBSTER    3,155,292
SAFETY VALVE ARRANGEMENT FOR PRESSURIZED CONTAINERS
Filed April 13, 1962

INVENTOR
MILO E. WEBSTER

BY Burgess Dinklage & Sprung
ATTORNEYS

United States Patent Office 3,155,292
Patented Nov. 3, 1964

3,155,292
SAFETY VALVE ARRANGEMENT FOR
PRESSURIZED CONTAINERS
Milo E. Webster, Rochester, N.Y., assignor to Bernz O
Matic Corporation, a corporation of New York
Filed Apr. 13, 1962, Ser. No. 187,407
2 Claims. (Cl. 222—397)

This invention relates to a safety valve arrangement for pressurized containers.

For safety purposes, cylinders and other containers for gases or liquids under pressure are often provided with excess pressure relief valves in order to prevent the build up of excess pressure in the container due to excessive temperatures or the like which could cause bursting and/or explosion. These excess pressure relief valves were generally of the spring-loaded, reseatable type, or of the blow-out type, as for example frangible discs. In either case, the valves were set to lift or blow prior to a dangerous pressure build up within the container.

In connection with small, portable, pressurized containers, and in particular throw-away aluminum cylinders, as for example with liquefied propane or other fuel gas, I have found that none of various types of safety relief valves are completely reliable or safe under all conditions.

In use the containers are sometimes subjected to excessive heat in the absence of fire conditions, as for example upon being exposed to sunlight for prolonged periods in a confined space, as for example in an automobile. Under these conditions, the excessive pressure blow-out closure, such as a frangible disc, did not prove satisfactory as the same was not reseatable and would release the entire contents of the container in the confined space often presenting a severe fire and explosion hazard.

On the other hand, when subjected to actual fire conditions, the spring-loaded reseatable excess pressure relief valves did not prove satisfactory. The heat of the fire often, particularly in the case of aluminum, detrimentally affects the wall strength of the container, and the bursting point of the container is reached before the relief valve had an opportunity to sufficiently relieve the pressure below the danger point. This causes an explosion of the container with the dangerous propelling of many shrapnel-like pieces.

One object of this invention is a valve arrangement for pressurized containers, and in particular portable throwaway aluminum containers, which overcomes the above-mentioned disadvantages and provides a degree of safety which was not hitherto achieved.

A further object of this invention is a closure cap for a pressurized container which cap contains, in addition to the normal dispensing valve, a safety valve arrangement which is reliable under all conditions.

These and still further objects will become apparent from the following description read in conjunction with the drawing in which.

Figure 1:
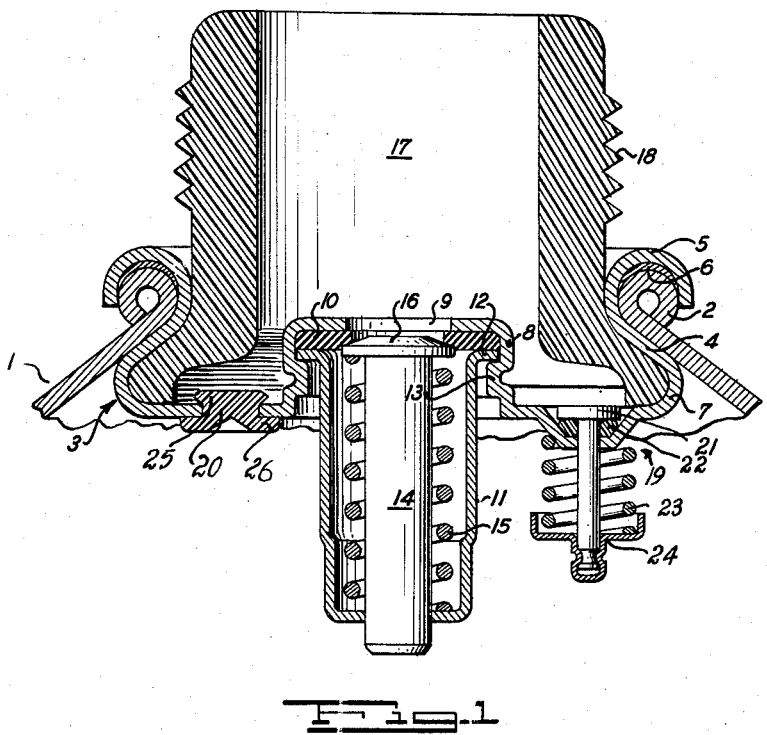
FIG. 1 is a vertical section of an embodiment of a closure cap in accordance with the invention on a pressurized container.
Figure 2:
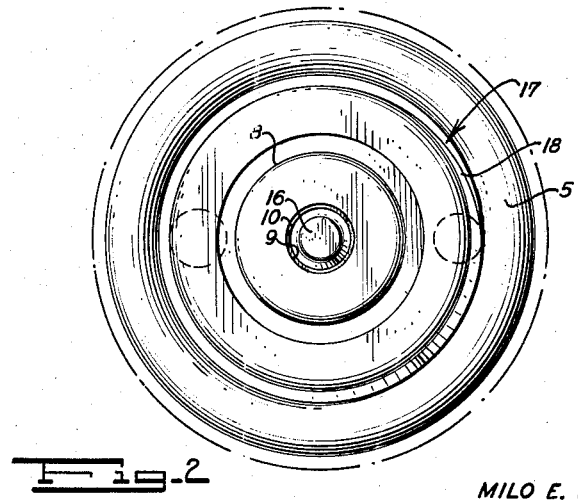
FIG. 2 is a plan view of the closure cap of FIG. 1.

In accordance with the invention, the pressurized container is provided with, in addition to the normal dispensing valve, a spring-loaded excess pressure relief valve of a reseatable type, and a separate excess pressure blow-out closure. The excess pressure blow-out closure should be set to blow at a higher pressure than will cause the spring-loaded excess pressure relief valve to open, as for example a 15–25% greater pressure. Additionally, the spring-loaded excess pressure relief valve should have a very small outlet discharge passage so as to discharge at a slow rate.

Most preferably these two safety valves are combined with a normal dispensing valve in a single closure cap of conventional construction.

Referring to the embodiment shown in the drawings, 1 represents an aluminum cylinder of the portable throwaway type, as for example containing liquefied propane for torches and other burning appliances. The container has a central opening defined by the beaded edge 2. This opening is sealed by a crimped-in-place closure cap, generally designated at 3. The peripheral side walls 4 of the cap are provided with the flange 5 which is formed to fit over the bead 2. A rubber gasket or elastic sealing compound 6 is interposed between the flange 5 and bead 2 to provide a gas-tight seal. The peripheral side walls 4 of the cap are bulged out at 7 by crimping with a suitable tool to seal and firmly hold the cap 3 in place in the conventional manner.

The central portion of the cap 3 is pressed upwardly in the form of a cylindrical step 8 for the dispensing valve. The step 8 has a central discharge opening 9 and an annular gasket 10 with a corresponding central opening of somewhat smaller diameter is positioned therebelow. This gasket is constructed of elastic material, such as neoprene rubber. A metal sleeve 11, provided with a flange 12, is positioned below the step 8 so that the gasket 10 is pressed between the flange 12 and the top of the step 8. The flange 12 and sleeve 11 are secured in place by deforming of the step 8 by crimping at 13. A valve stem 14 is positioned for axial movement within the sleeve 11. A spring 15 forces the head 16 of the valve stem 14 against the gasket 10 forming a gas-tight seal. When the valve stem 14 is pressed inwardly against the spring force, flow communication is established from the interior of the container through the sleeve 11 out through the opening 9. A plastic bushing 17, as for example of nylon, provided with the external male threads 18, is pressed in place in the cap 3 as shown. The bushing 17 and the dispensing valve arrangement in the cap 3 are designed to receive conventional tap connection on a portable gas-burning appliance, as for example, is shown in United States Patent 2,793,504. The tap connection is screwed over the threads 18 and has a central tube or stem with a gas-flow passage which extends into the opening 9 and forms a gas-tight seal with the gasket 10 and presses the valve stem 14 open establishing gas-flow communication from the interior of the container through the sleeve 11 and opening 9 into the hollow stem and thence to the burning appliance, such as the torch.

In accordance with the invention, the cap 3, in addition to being provided with the dispensing valve as described, is provided with a reseatable spring-loaded excess pressure relief valve 19 and an excess pressure blow-out closure 20. The spring-loaded excess pressure relief valve 19 consists of the valve member 21, which extends through a small hole in the bottom of the cap 3 and is seated against the rubber gasket 22 surrounding this opening. The valve is held in its shut position by means of the spring 23 acting against the spring retainer 24, positioned at the end of the valve stem, and the under side of the cap 3. Excess pressure within the container, depending on the compressive force of the spring 23, will tend to lift the valve.

The blow-out closure 20 consists of a Buna rubber plug 25 provided with a flange 26 and fitted in a corresponding hole in the bottom of the cap 3 so that upon sufficient pressure build up, depending upon the elasticity of the plug and the size of the flange 26, the plug will be blown out. The spring-loaded excess pressure relief valve 19 may, for example, be so adjusted that it will start to open at 325 plus or minus 25 pounds per square inch, and the excess pressure blow-out closure 20 may be set to blow at 400–450 pounds per square inch and when blown to allow complete discharge of the container within 5–10 seconds as the same is in free flow communication with the ambient atmosphere and thus no substantial pressure is built up on the outlet side.

The valving combinations in accordance with the invention have been found to allow reliable pressure release without danger of explosion of the container and with a maximum degree of safety under all the varied conditions under which excess pressure may build up within the container.

While the invention has been described in detail with reference to the specific embodiments shown, various changes and modifications which fall within the spirit of the invention will become apparent to the skilled artisan. The invention is, therefore, only intended to be limited by the appended claims or their equivalents wherein I have endeavored to claim all inherent novelty.

I claim:
1. In an aluminum cylinder of the portable throw-away type for fuel gas having a closure cap with a centrally positioned dispensing valve, the improvement which comprises the closure cap additionally containing a spring-loaded excess pressure relief valve, extending through the bottom of said closure cap, alongside the dispensing valve, and an excess pressure blow-out closure, said spring-loaded excess pressure relief valve being set to bleed at a pressure of 300–350 pounds per square inch gauge, and said blow-out closure being set to blow at a pressure of about 400–450 pounds per square inch gauge, with said spring-loaded excess pressure relief valve being dimensioned so as to have a slow rate of gas discharge, whereby when said cylinder is subjected to excessive heat in the absence of fire conditions, the spring-loaded excess pressure relief valve can operate to lower the internal pressure of the container to the extent required to prevent the bursting of said container and also limit the quantity of gas released under such conditions to that which is required to prevent bursting of the container, said excess pressure blow-out closure being in free flow communication with the ambient atmosphere and dimensioned to empty the cylinder upon blowing within 5–10 seconds, whereby when said cylinder is subjected to excessive heat in the presence of fire conditions, the blow-out closure can operate to empty the container sufficiently rapidly to prevent explosion.

2. Improvement according to claim 1 in which said excess pressure blow-out closure comprises a rubber plug.

References Cited by the Examiner

UNITED STATES PATENTS

| | | | |
|---|---|---|---|
| 2,301,724 | 11/42 | Vischer | 220—44 |
| 2,303,359 | 12/42 | Mothersall. | |
| 3,011,686 | 12/61 | Rockwell | 222—397 |
| 3,083,870 | 4/63 | Gillespie | 222—386.5 |

LOUIS J. DEMBO, *Primary Examiner.*
LAVERNE D. GEIGER, *Examiner.*